(12) United States Patent
Ochs

(10) Patent No.: US 12,103,297 B2
(45) Date of Patent: Oct. 1, 2024

(54) PRINTING PLATE AND METHOD FOR DETECTING A POSITION THEREOF

(71) Applicant: BOBST BIELEFELD GMBH, Bielefeld (DE)

(72) Inventor: Rainer Ochs, Kirchheim/Teck (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 0 days.

(21) Appl. No.: 18/003,732

(22) PCT Filed: Jun. 24, 2021

(86) PCT No.: PCT/EP2021/067383
§ 371 (c)(1),
(2) Date: Dec. 29, 2022

(87) PCT Pub. No.: WO2022/002757
PCT Pub. Date: Jan. 6, 2022

(65) Prior Publication Data
US 2023/0256729 A1    Aug. 17, 2023

(30) Foreign Application Priority Data
Jul. 2, 2020 (EP) ..................................... 20183763

(51) Int. Cl.
*B41F 27/00*     (2006.01)
*B41F 33/00*     (2006.01)
(Continued)

(52) U.S. Cl.
CPC ........ *B41F 27/005* (2013.01); *B41F 33/0081* (2013.01); *G06V 10/431* (2022.01);
(Continued)

(58) Field of Classification Search
CPC ................ B41F 27/005; B41F 33/0081; B41P 2227/30; G06V 10/431; G06V 10/751; G06V 10/44; G06V 10/245
See application file for complete search history.

(56) References Cited

U.S. PATENT DOCUMENTS 3,319,513 A * 5/1967 Gulick .................. B41F 27/005
33/618
5,056,430 A * 10/1991 Bayerlein ........... B41F 33/0081
101/211
(Continued)

FOREIGN PATENT DOCUMENTS

DE      102005053432 A1     5/2007
JP        2003285525 A   * 10/2003

OTHER PUBLICATIONS

JP 200385525 Machine Translation (Year: 2003).*

*Primary Examiner* — David H Banh
(74) *Attorney, Agent, or Firm* — Bookoff McAndrews, PLLC

(57) ABSTRACT

A printing plate (10) having at least one optical marker (12, 14) for detecting a position of the printing plate (10) is described. The optical marker (12, 14) comprises an optically detectable structure (18) being positioned within a periphery (20) of the marker (12, 14). Furthermore, a method for detecting a position of a printing plate (10) is presented. Additionally, a control unit (38) for a system (36) for detecting a position of a printing plate (10) and a system (36) for detecting a position of a printing plate (10) are explained. Moreover, a computer program comprising computer readable program code means for causing steps of the method is defined.

9 Claims, 6 Drawing Sheets

Figure 1:
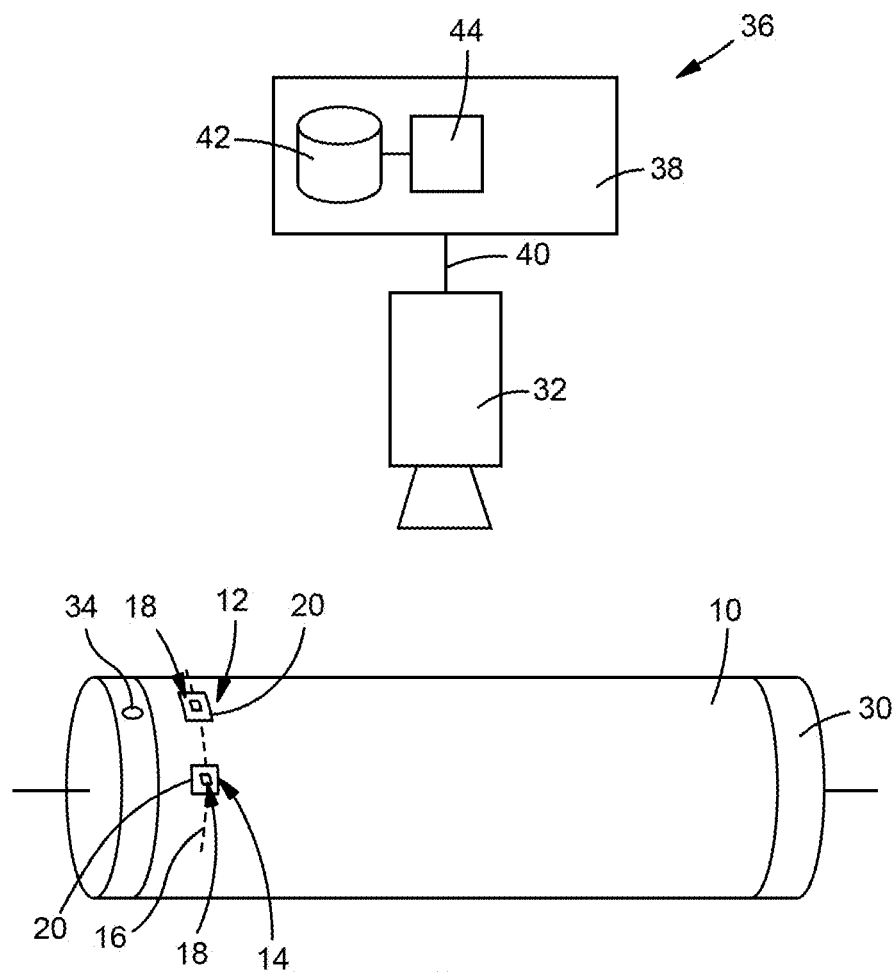

(51) Int. Cl.
  *G06V 10/42* (2022.01)
  *G06V 10/75* (2022.01)
  *G06V 10/24* (2022.01)
  *G06V 10/44* (2022.01)

(52) U.S. Cl.
  CPC ........ *G06V 10/751* (2022.01); *B41P 2227/30* (2013.01); *G06V 10/245* (2022.01); *G06V 10/44* (2022.01)

(56) References Cited

U.S. PATENT DOCUMENTS

| | | | |
|---|---|---|---|
| 5,337,668 A * | 8/1994 | Matsuoka | G03F 9/00 |
| | | | 101/481 |
| 5,626,076 A * | 5/1997 | Ireton | B41F 27/005 |
| | | | 101/481 |
| 5,633,676 A * | 5/1997 | Harley | B41F 27/005 |
| | | | 348/95 |
| 5,778,779 A | 7/1998 | Jones et al. | |
| 2007/0125254 A1 | 6/2007 | Gartner | |
| 2007/0181027 A1 * | 8/2007 | Kanazawa | B41F 33/0081 |
| | | | 101/484 |
| 2007/0272103 A1 * | 11/2007 | Caliari | B41F 27/005 |
| | | | 101/248 |
| 2008/0137052 A1 * | 6/2008 | Matsumoto | G03F 7/70625 |
| | | | 355/62 |
| 2008/0236426 A1 | 10/2008 | Cummings et al. | |
| 2009/0154800 A1 * | 6/2009 | Kojima | H04N 19/117 |
| | | | 382/165 |
| 2014/0083316 A1 * | 3/2014 | Choi | B41F 33/0081 |
| | | | 101/485 |
| 2015/0174934 A1 * | 6/2015 | Bogart | H04N 1/00 |
| | | | 347/19 |
| 2015/0246526 A1 * | 9/2015 | Schwitzky | B41F 27/005 |
| | | | 101/481 |
| 2018/0250971 A1 * | 9/2018 | Singla | B65H 45/18 |
| 2019/0193415 A1 * | 6/2019 | Yamamoto | B41J 2/2142 |
| 2021/0375780 A1 * | 12/2021 | Huang | H01L 23/544 |

* cited by examiner

PRINTING PLATE AND METHOD FOR DETECTING A POSITION THEREOF

CROSS-REFERENCE TO RELATED APPLICATION(S)

This application is a National Stage Application under 35 U.S.C. § 371 of International Application No. PCT/EP2021/067383, filed Jun. 24, 2021, which claims priority to European Application No. 20183763.0, filed on Jul. 2, 2020, the entireties of which are incorporated herein by reference.

The invention relates to a printing plate having at least one optical marker for detecting a position of the printing plate.

The invention is additionally directed to a method for detecting a position of a printing plate.

The invention also relates to a control unit for a system for detecting a position of a printing plate, wherein the control unit is configured for causing steps of the above-mentioned method.

Moreover, the invention is directed to a system for detecting a position of a printing plate comprising a control unit as mentioned above.

Furthermore, the invention relates to a computer program comprising computer readable program code means for causing and/or performing steps of the above method.

Printing plates generally need to be precisely positioned within a printing machine in order to achieve printing results of high quality. This is especially the case if a multi-color print is required. In this context an image to be printed is decomposed in a number of single color images which are successively printed on a substrate. All single color images together form the multi-color image. Usually, each single color image is printed on the substrate using a specific printing plate. It is obvious that these printing plates need to be positioned within the printing machine with utmost precision. Otherwise, areas of different color would be offset or tilted with respect to each other.

It is known in the art to equip printing plates with optical markers. These markers can be used to precisely position the printing plates within a printing machine. Such markers can be arranged on the printing plate such that they create a part of an image to be printed, i.e. the marker produces a portion of a printed image on the substrate. Alternatively, markers can be arranged in a margin area of the printing plate. Thus, the marker still produces a print on the substrate but it does not form part of the desired image and therefore may be cut away. Especially in the first case markers need to be relatively small, so-called micro-markers, in order not to disturb the printing result. In the second case bigger markers can be used. In both cases the position of the print created by the marker is analyzed. Based thereon the position of the corresponding printing plate inside the printing machine is corrected until a satisfactory alignment is achieved.

An alternative approach consists in using the markers for detecting the position of a printing plate during its mounting on the corresponding printing cylinder. In this case the marker itself needs to be detected and not a print produced by the marker. It is usually desired to mount the printing plate on the corresponding printing cylinder in an automated way. In known approaches the marker on the printing plate is observed by a camera system. Subsequently, a captured image is processed in order to derive a current position of the printing plate and compare it to a desired position. If necessary, the position of the printing plate may be adjusted by a manipulator interacting therewith.

However, the detection quality of the markers has proven not to be satisfactory. This is especially the case for relatively small markers. Furthermore, it has been found that the detection quality of the markers strongly depends on ambient conditions and the type and material of the printing plate.

The problem to be solved by the invention is consequently to improve markers of printing plates such that they are detectable with high precision and reliability. Influences of ambient conditions, the type of the printing plate and the material from which the printing plate is manufactured shall be avoided.

The problem is solved by a printing plate having at least one optical marker for detecting a position of the printing plate, wherein the optical marker comprises an optically detectable structure being positioned within a periphery of the marker. The periphery of the marker is to be understood as a closed line following the outer border delimiting the marker. The optically detectable structure has a certain regularity and is provided on purpose, i.e. optical noise is not considered to be an optically detectable structure. Since the optically detectable structure is arranged within the periphery, it will also be designated an inner structure in the following. Especially when comparing the marker according to the invention to a known marker which relies on the detection of its periphery only, it results that the marker according to the invention offers more optical edges, i.e. border lines between areas of different optical characteristics, and more contrast, i.e. differences in optical characteristics along an edge. This circumstance can be summarized in that the marker according to the invention comprises more optical information than known markers. Because of this information the detection reliability and the precision of detection are enhanced. Furthermore, the influence of ambient conditions and the properties of the printing plate is reduced. This is especially the case for relatively small markers. Moreover, the plausibility of recognition is enhanced by providing the inner structure since the probability that a structure of the printing plate not being the marker is by mistake considered to be the marker (false positive detection) is reduced.

The basic idea underlying the present invention is thus to create a marker having an optically detectable inner structure and use the inner structure in addition to a periphery of the marker for detection purposes.

A length and/or a width of a marker according to the invention may be 0.2 mm to 5 mm, preferably 0.5 mm to 3 mm. It has to be kept in mind that a bigger marker may be easier to detect, wherein a smaller marker may be less disturbing within a printing result.

Elements of the optically detectable structure are preferably 10 micrometers to 300 micrometers wide, more preferably 20 to 250 micrometers wide.

In a preferred embodiment, the printing plate is a flexible relief printing plate, e.g. elevated elements of the relief receive the ink for printing.

The optically detectable structure may comprise at least two areas differing in brightness and/or in spatial frequency, especially wherein the areas differ in their respective grey scale. In this context the term grey scale is understood as also comprising black and white. The spatial frequency characterizes a spatially periodic pattern. More precisely, the spatial frequency is a measure of how often an element of a structure is repeated per unit of distance. All of these optical characteristics are easily detectable. Furthermore, they can be detected with high reliability and precision. Also, optical markers comprising structures with such characteristics may be produced at low cost.

Preferably, a cumulated length of all border lines between the at least two areas exceeds a length of the periphery of the marker. It is especially preferred that the cumulated length of all border lines exceeds the length of the periphery by at least 50%. The cumulated length of all border lines may also be 100%, 150%, 200% or 300% of the length of the periphery. The border line between the at least two areas may also be designated an edge. This term is more common in the fields of automatic image processing. The border line between the at least two areas constitutes a kind of optical information. If a high number of such border lines having a relatively long cumulated length are detected, the reliability and precision of detection are enhanced. It may also be sufficient to detect just a portion of the border lines.

At least one of the areas can have the form of a ring segment or a polygon segment, especially wherein the area is ring-shaped or polygon-shaped. In this context a polygon-shape is directed to the polygonal chain and not to the surface enclosed therewith. In other words, the area has the form of a strip being ring-shaped or polygon-shaped. In other words, the area corresponds to a portion of a thick line. Preferably, the area is circle-shaped, ellipse-shaped or rect-angle-shaped. The geometrical elements may also differ in their respective spatial frequency. Such areas may be used to form inner structures having a high content of optical information, thereby leading to a reliable detection of the marker.

According to an embodiment, at least two of the areas are ring-shaped or polygon-shaped, wherein the areas are arranged concentrically. Such ring-shaped or polygon-shaped areas may have a continuously closed periphery. Alternatively, the periphery may be interrupted, i.e. the periphery may comprise voids. In both cases concentrically arranged structures lead to improved precision in the detection of the marker.

In a variant the optical marker is integrally formed with the printing plate. This means that the marker is not formed as a separate component which is joined to the printing plate, e.g. a sticker. Consequently, the marker is inseparably connected to the printing plate, thereby excluding loss of the marker and positioning errors of the marker relative to the printing plate. Furthermore, integrally forming the marker with the printing plate causes comparatively low manufacturing efforts, especially as compared to the separate production of the marker and the printing plate and a corresponding joining operation. If the printing plate comprises a plurality of layers, a marker integrally formed in one of the layers is understood to be integrally formed with the printing plate.

In a preferred example, the marker is integrated into a layer of the printing plate which is made from UV-curing polymer. This layer may be the top layer of the printing plate. During the production of such a printing plate a layer of non-cured UV-curing polymer is covered by a cover layer. From the cover layer, certain areas will be eliminated by laser treatment. These areas may correspond to those areas being used for printing an image. The cover layer from which these areas are eliminated may also be designated a mask. Subsequently, UV light is applied to the printing plate, wherein the UV curing polymer cures or polymerizes in the areas which are not covered by the cover layer, but stays uncured in the areas covered by the cover layer. Thereafter, the non-cured parts of polymer layer may be eliminated, e.g. by washing. As a result of this process a relief printing plate is created, wherein elevated elements of the relief are configured for receiving the ink for printing. It is directly apparent that an optical marker may be formed in the layer from UV-curing polymer by the same process and simultaneously to producing the relief. Consequently, the integration of the marker does only require a negligible additional effort. Furthermore, by using this process very small structures, e.g. forming the inner structure of the marker, can be integrated into the printing plate.

The layer of UV-curing polymer of printing plates produced by the above process may be transparent or translucent and therefore function as a light guide. This characteristic may have disturbing effects on the recognition of the marker since areas thereof may appear brighter than they are. However, this effect is reduced if the size of the structure is reduced. Consequently, when using markers of small size the effect of light guiding is negligible. This is the case for glossy or non-glossy printing plates.

More than one optical markers may be provided on the printing plate, especially wherein the optical markers are arranged along a straight line. In doing so the printing plate can be positioned with enhanced precision. This is especially helpful for printing plates of big size. Moreover, by using more than one markers a certain redundancy is created which further increases the reliability of detection.

The problem is also solved by a method for detecting a position of a printing plate, comprising the following steps:
a) providing a printing plate according to the invention,
b) capturing an image of the printing plate or at least a portion thereof comprising the marker by a camera unit,
c) determining a position of the marker in the captured image by identifying the structure being positioned within the periphery of the marker in the captured image, and
d) deriving the position of the printing plate from the position of the marker in the captured image.

The marker can be detected with high reliability in that the inner structure of the marker is identified. Furthermore, due to the identification of the inner structure the position of the printing plate may be derived with high precision. As has been explained before, ambient conditions and the specific nature of the printing plate have only minor effects on the detection of the marker. Consequently, the method is very robust.

In the above method the positions of the marker and the printing plate may be expressed as relative or absolute positions. Furthermore, the positions may be defined as one-dimensional or two-dimensional positions.

Especially during method step b), at least the portion of the printing plate comprising the marker may be illuminated in order to enhance the quality of the captured image.

The method may be used for precisely positioning the printing plate on a corresponding printing cylinder. This means that the derived position of the printing plate is either used for determining a correction value by which the printing plate needs to be moved in order to be in the desired position or the derived position is used as a parameter for a printing machine in which the printing plate is used.

If one or more steps of the method according to the invention are caused or performed by a computer, those steps may be cumulatively designated a computer implemented method.

The above method may be performed by a human being, preferably using an optical device, e.g. a magnifying glass, and/or a measuring device. Alternatively, the method may be at least in parts performed automatically as will be explained later.

According to an embodiment, the structure is identified by evaluating a grey scale distribution and/or a spatial frequency distribution of the captured image. These evaluations can be performed at high speed and with high reliability. Furthermore, the evaluation of a grey scale distribution and a spatial frequency distribution as such are known and well-established techniques in image processing. Consequently, such a method may be executed in a simple and robust manner.

It is also possible that the structure is identified by applying a pattern recognition technique, an object recognition technique and/or a digital image correlation technique to the captured image. These techniques as such are well-established in the fields of image processing and therefore are well-suitable for reliably identifying the structure within a short time. It is also possible that more than one pattern recognition techniques or more than one object recognition techniques are applied for enhancing the reliability and precision of the method.

In a variant, an edge detection technique is applied to a portion of the captured image comprising the marker. Also edge detection techniques as such are well-known in the fields of image processing and provide results of good quality within a short time. Care has to be taken that the edge detection technique is only applied to those parts of an image showing the marker. Otherwise, also edges of the printing areas would be recognized.

In this context, a cumulative length of the detected edges of the structure may be calculated, especially wherein the cumulative length is taken as an indicator for detection quality. A cumulative length of all detectable edges can be easily calculated by adding the lengths of each detected edge. The actual cumulative length of all edges of the marker may be known from the design of the marker. It constitutes a theoretical maximum of the cumulative length of detected edges because not all edges might be detected or not all edges might be detected over their respective full length. Since the edges are more or less distributed within the periphery of the marker, a quotient of the cumulative length of detected edges and the theoretical maximum can be taken as an indicator of the percentage of the marker that has been detected. Alternatively, other cumulated lengths of detected edges can be taken as a benchmark instead of the theoretical maximum. In all variants the detection of the marker is enhanced by a quality indicator which further increases the reliability of the method.

The effects and advantages mentioned for the method according to the invention also apply to the printing plate according to the invention and vice versa.

The problem is additionally solved by a control unit for a system for detecting a position of a printing plate, wherein the control unit is configured for causing method steps b) to d). Preferably, the printing plate is a printing plate according to the invention. With such a control unit the above method, especially method steps b) to d) can be supported. The effects and advantages mentioned for the method also apply to the control unit and vice versa. The control unit is preferably a computer.

The control unit may be configured for causing a camera unit to capture an image of the printing plate or at least a portion thereof comprising the marker. To this end, the control unit may comprise a camera control module being realized in software and/or hardware, which is configured to cause the camera unit to capture the above-described image.

Furthermore, the control unit may be configured for determining a position of the marker in the captured image by identifying the structure being positioned within the periphery of the marker in the captured image. To this end, the control unit may comprise an image-processing module, which receives the image captured by the camera unit as an input. The image processing module may comprise a grey-scale evaluation module which is configured for evaluation a grey scale distribution in the image, a special frequency evaluation module which is configured for evaluation a spatial frequency distribution of the image, a pattern recognition module which is configured for performing a pattern recognition technique on the image, an object recognition module which is configured for performing an object recognition technique on the image, a digital image correlation module which is configured for performing a digital image correlation technique on the image and/or an edge detection module which is configured for performing an edge detection technique on the image. All of the above-mentioned modules may be realized as software modules, hardware modules or a combination thereof. It is noted that for example pattern recognition, object recognition and edge detection can also be performed by a human being.

Additionally, the control unit is configured for deriving the position of the printing plate from the position of the marker in the captured image.

The control unit may also comprise a calculation module which is configured for calculating a cumulative length of detected edges. Preferably, the calculation module is connected to an edge detection module such that data, e.g. coordinates, describing a number of detected edges can be communicated from the edge detection module to the calculation module. The calculation module is configured for calculating the length of every edge and adding up all lengths in order to get to a cumulative length of all detected edges. In addition, the calculation module can be realized as software module, hardware module or a combination thereof.

All modules mentioned above contribute to the fact that the control unit allows for detecting the position of a printing plate in a reliable and precise manner. Furthermore, influences of ambient conditions and/or the nature of the printing plate are strongly reduced.

Moreover, the problem is solved by a system for detecting a position of a printing plate, especially a printing plate according to the invention. The system comprises a control unit according to the invention and a camera unit, wherein the camera unit is coupled to the control unit such that an image captured by the camera unit may be provided to the control unit. Once a printing plate having a marker is provided, this system can be used for performing the remaining steps of the method according to the invention. Consequently, the same effects and advantages that have already been mentioned in connection with the method and/or the control unit apply also to the system and vice versa.

Furthermore, the problem is solved by a computer program comprising computer readable program code means for causing step b) and performing steps c) and d) of the method according to the invention, if the computer program is executed on a computer, especially on a control unit according to the invention. In this context program code means are instructions having the form of program code and/or program code modules. The program code or the program code modules can be compiled or non-compiled and can be represented in any programming language or machine language.

The computer program may comprise program code modules which substantially correspond to the modules of the control unit according to the invention as described above. The features, effects and advantages described in connection with the modules of the control unit also apply to the program code modules.

The computer program as mentioned above can be stored on any computer readable data medium. Said otherwise, a computer readable data medium or data medium signal may be provided on which a computer program according to the invention is stored.

Figure 3:
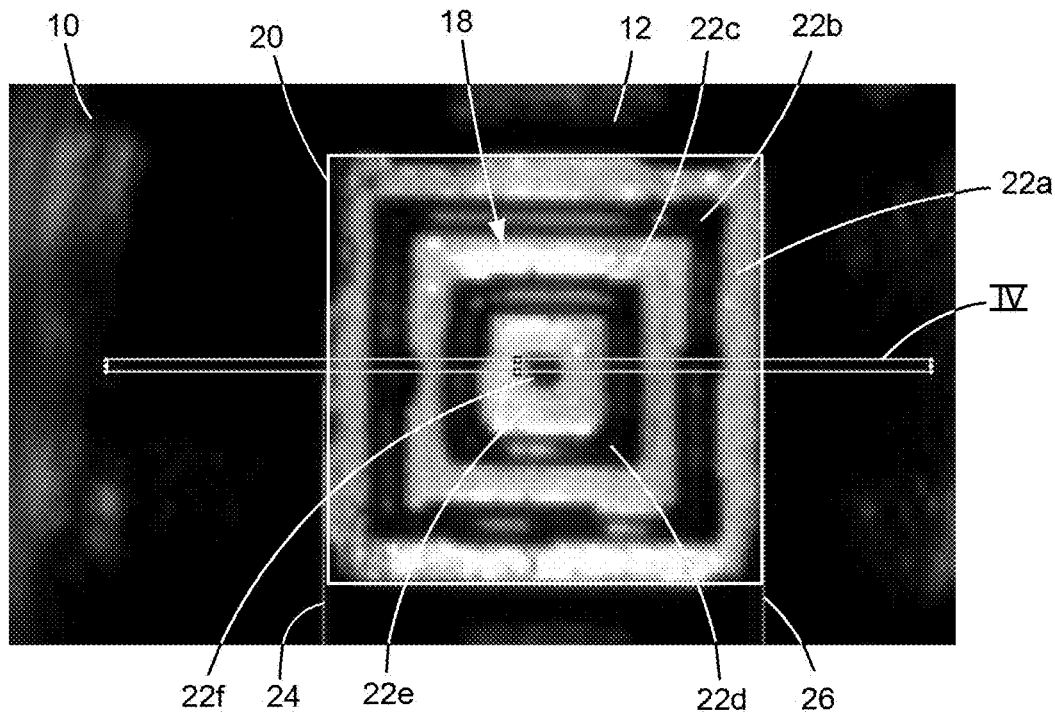
Figure 4:
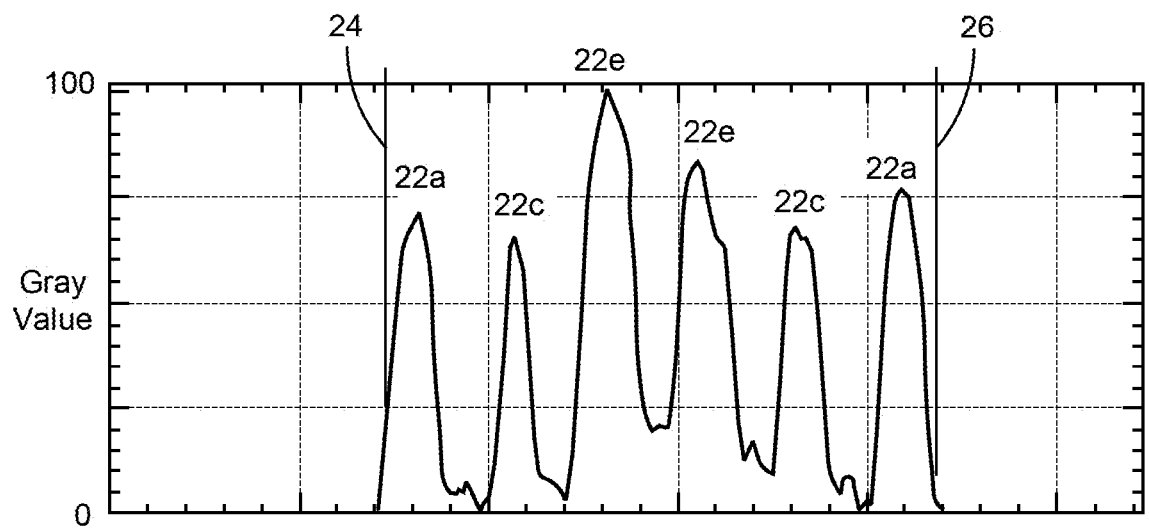
Figure 5:
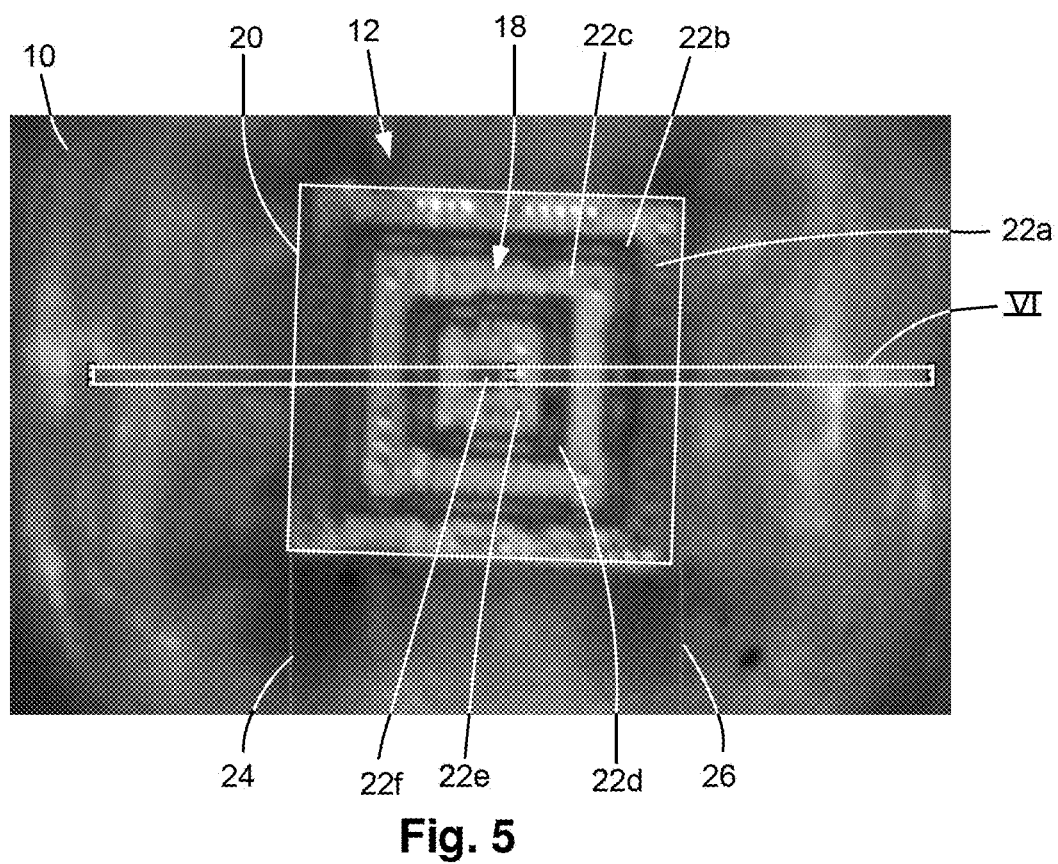
Figure 6:
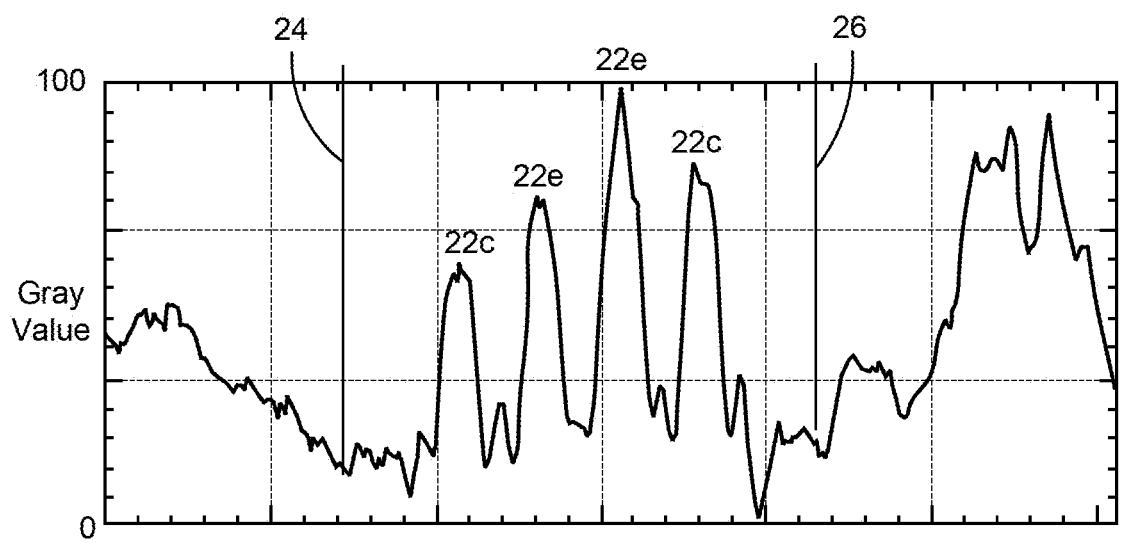
Figure 7:
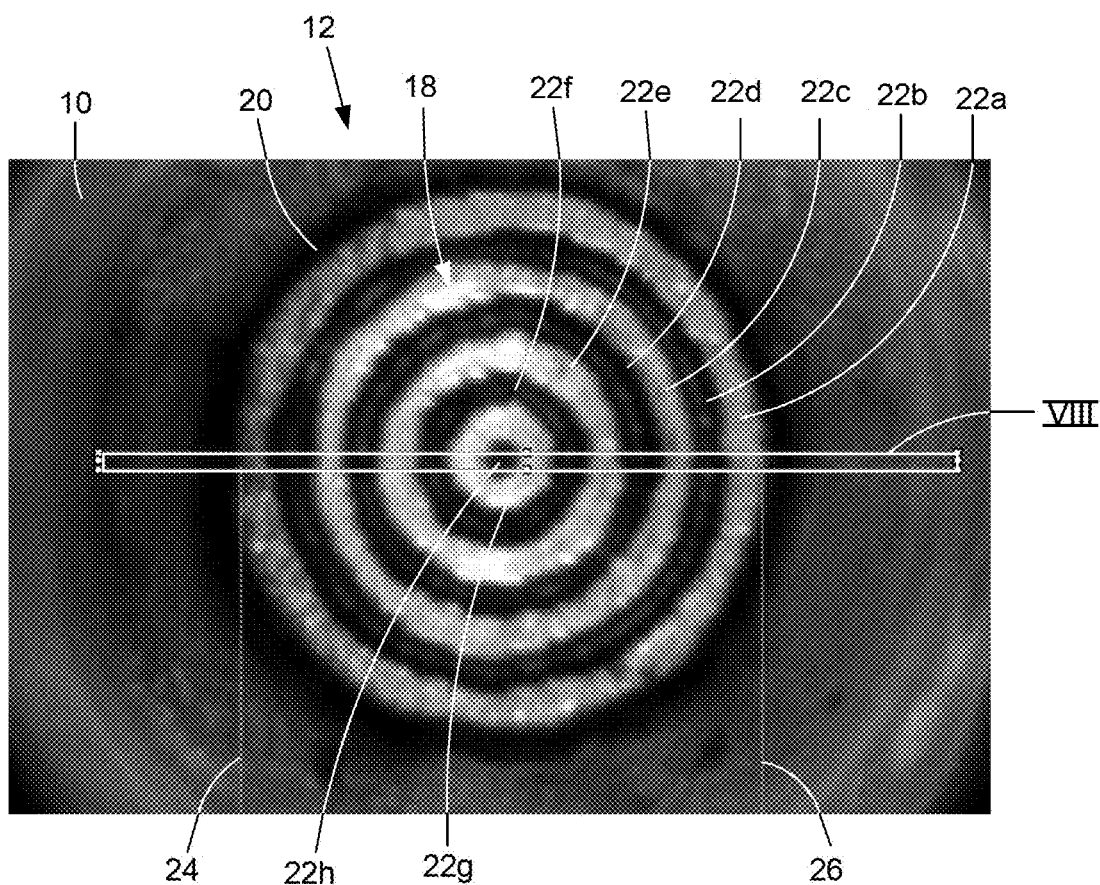
Figure 8:
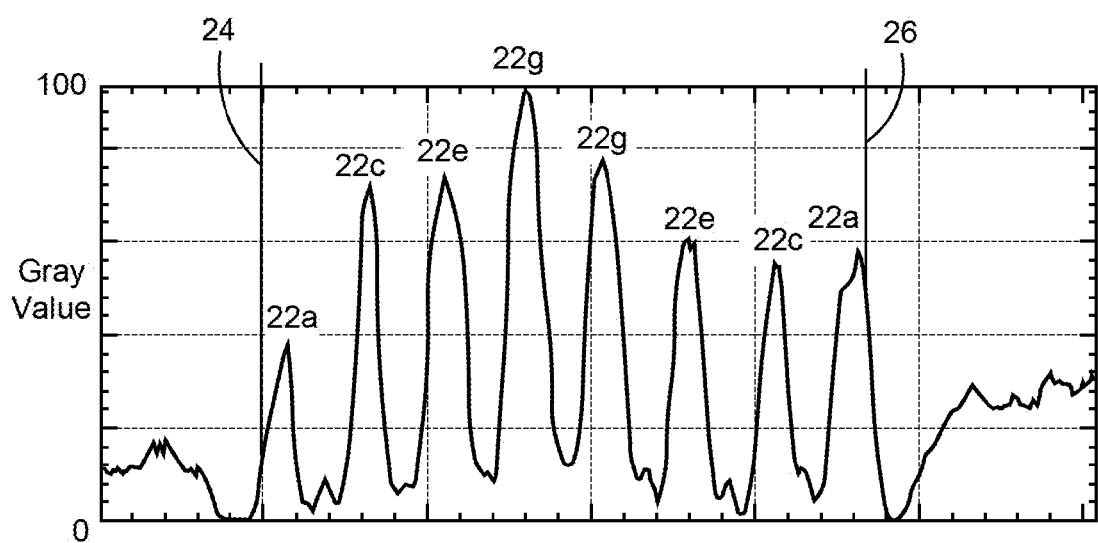
Figure 9:
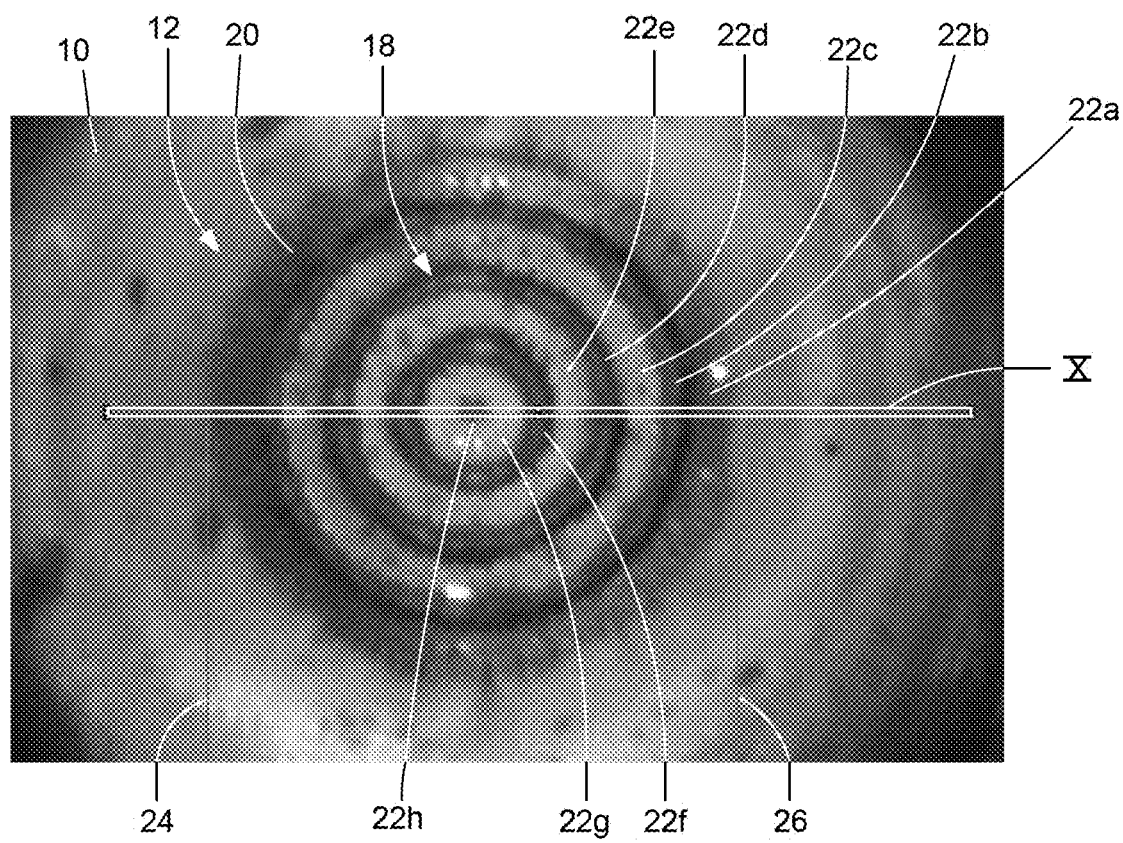
Figure 10:
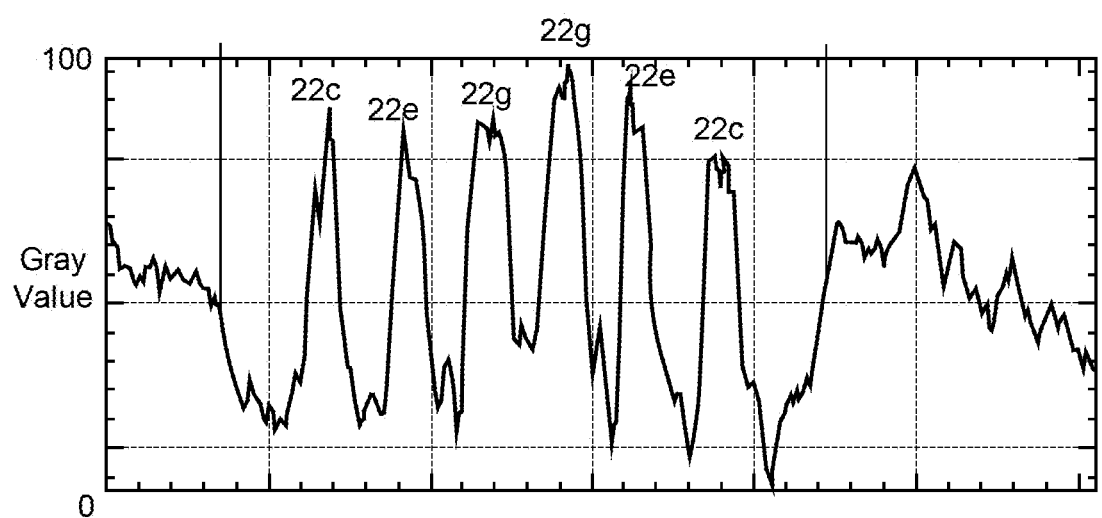
Figure 11:
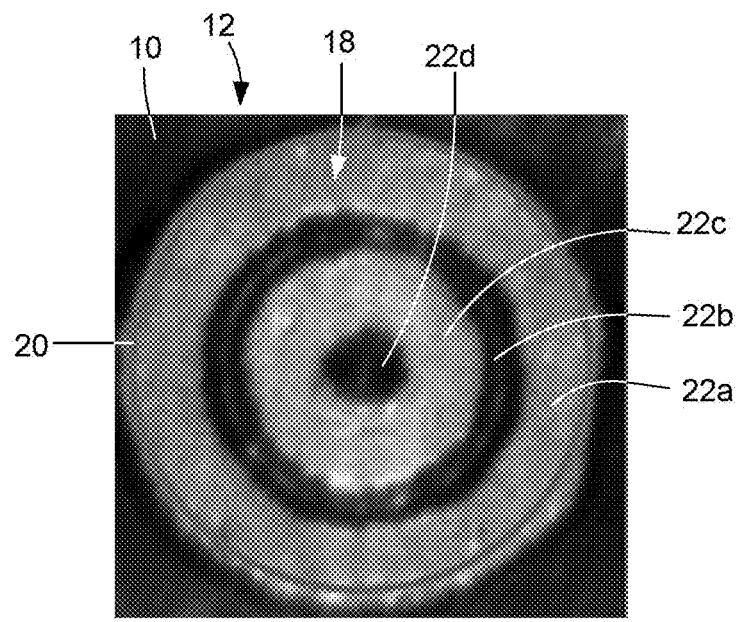
Figure 12:
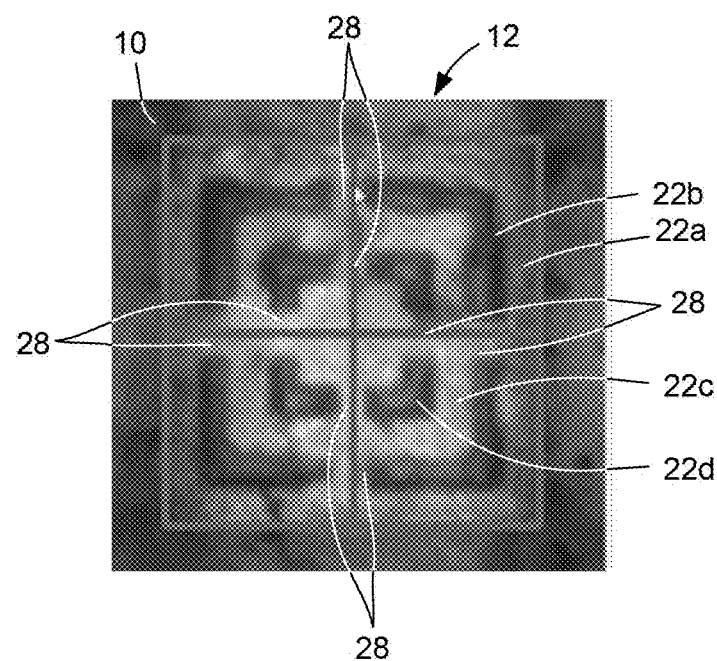

The invention will now be described with reference to the enclosed drawings. In the drawings, FIG. 1 shows a system according to the invention for detecting a position of a printing plate, comprising a control unit according to the invention on which a computer program according to the invention is stored and executable, and a printing plate according to the invention which is mounted on a corresponding printing cylinder, FIG. 2 shows the printing plate of FIG. 1 in a state where it is not mounted on the corresponding printing cylinder, FIG. 3 shows a portion of the printing plate of FIGS. 1 and 2 comprising a marker according to a first variant, FIG. 4 shows a grey value distribution in a zone IV of FIG. 3, FIG. 5 shows a portion of an alternative printing plate, wherein the view corresponds to the view of FIG. 3 and the same marker as in FIG. 3 is provided on the printing plate, FIG. 6 shows a grey value distribution in a zone VI of FIG. 5, FIG. 7 shows a portion of the printing plate of FIGS. 1 and 2 comprising a marker according to a second variant, FIG. 8 shows a grey value distribution in a zone VIII of FIG. 7, FIG. 9 shows a portion of the printing plate of FIG. 5, wherein the marker according to the second variant is provided on the printing plate, FIG. 10 shows a grey value distribution in a zone X of FIG. 9, FIG. 11 shows a portion of a printing plate being equipped with a marker according to a third variant, and FIG. 12 shows a portion of a printing plate being equipped with a marker according to a fourth variant.

Figure 2:
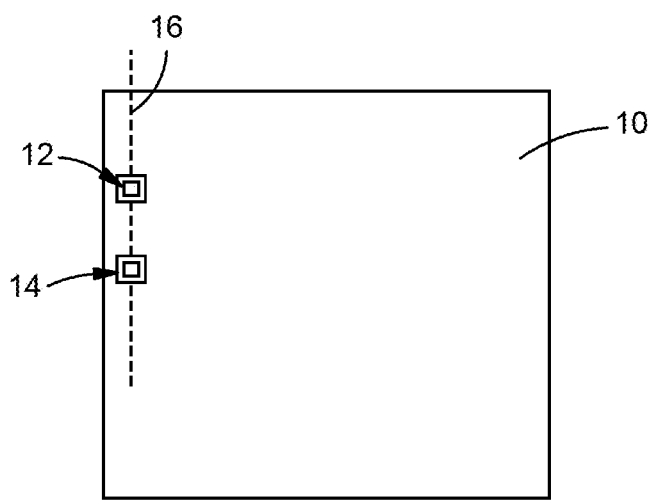

In FIGS. 1 and 2 a printing plate 10 is shown which comprises two optical markers 12, 14.

The optical markers 12, 14 are arranged along a straight line 16 if the printing plate 10 is in a flat position (cf. FIG. 2).

The printing plate 10 is a flexible relief printing plate, wherein the relief is formed in a layer of UV-cured polymer.

The optical markers 12, 14 are integrally formed in this layer.

In the following, the optical markers 12, 14 will be explained in detail. However, for the ease of explanation, reference will only be made to marker 12. The following explanation apply to optical marker 14 mutatis mutandis.

FIG. 3 shows an optical marker 12 according to a first variant which is formed on a smooth surface of the printing plate 10.

The optical marker 12 is substantially square-shaped and comprises an optically detectable structure 18 within its periphery 20.

This structure is made up of six areas 22a, 22b, 22c, 22d, 22e, 22f, wherein the areas 22a, 22b, 22c, 22d, 22e are substantially shaped as closed polygonal strips having the form of a thick square line and the area 22f is formed as a square.

All areas 22a, 22b, 22c, 22d, 22e, 22f are arranged concentrically.

As can be directly seen from FIG. 3 and in more detail in FIG. 4, the areas 22a, 22b, 22c, 22d, 22e, 22f differ in respect of their grey scale, wherein areas of high grey scale and low grey scale are arranged in an alternating manner along a direction extending from the periphery 20 of the marker towards its center.

In order to map the marker of FIG. 3 on the diagram of FIG. 4, two auxiliary lines 24, 26 are represented in both Figures. Additionally, the reference signs of the corresponding areas are noted besides the peaks in the grey scale distribution.

In FIG. 4 the grey value is represented in a relative manner ranging from 0% to 100%. The terms grey scale and grey value are synonyms.

Border lines between two areas of differing grey value are defined as edges and it clearly results from FIG. 3 that a cumulative length of all edges is a multiple of the length of the periphery 20 of the marker 12.

FIG. 5 also shows an optical marker 12 according to the first variant, thus the marker 12 is substantially the same as in FIG. 3. In the following, only the differences as compared to the printing plate 10 of FIG. 3 will be explained.

The marker 12 is now formed on a rough surface of the printing plate 10 offering less contrast as compared to the printing plate 10 disclosed in FIG. 3.

This results in a different grey scale distribution as can be seen from FIG. 5 and in more detail from FIG. 6.

FIG. 7 shows the printing plate 10 having an optical marker 12 according to a second variant, which is applied to a substantially smooth surface of the printing plate 10. Again, only the differences with respect to the embodiment of FIG. 3 will be explained.

The optical marker 12 is substantially round, i.e. its periphery 20 is substantially a circle line.

The optically detectable structure 18 within the periphery 20 is made up of eight areas 22a, 22b, 22c, 22d, 22e, 22f, 22g, 22h wherein the areas 22a, 22b, 22c, 22d, 22e, 22f, 22g are substantially shaped as circular strips and the area 22h is formed as a circle.

All areas 22a-22h are arranged concentrically.

As can be directly seen from FIG. 7 and in more detail in FIG. 8, the areas 22a, 22b, 22c, 22d, 22e, 22f, 22g, 22h differ in respect of their grey scale, wherein areas of high grey value and low grey value are arranged in an alternating manner when considering a direction extending from the periphery 20 of the marker towards its center.

In order to map the marker of FIG. 7 on the diagram of FIG. 8, two auxiliary lines 24, 26 are represented in both Figures. Additionally, the reference signs of the areas are noted besides the corresponding peaks in the grey scale distribution.

If again border lines between two areas of differing grey value are defined as edges, it clearly results from FIG. 7 that a cumulative length of all edges is a multiple of the length of the periphery 20 of the marker 12.

FIG. 9 also shows an optical marker 12 according to the second variant, thus the marker 12 is substantially the same as in FIG. 7. In the following, only the differences as compared to the printing plate of FIG. 7 will be explained.

The marker 12 is now formed on a rough surface of the printing plate 10 having less contrast that the printing plate 10 shown in FIG. 7.

This results in a different grey scale distribution as can be seen from FIG. 9 and in more detail from FIG. 10.

FIG. 11 shows a portion of a printing plate 10 having an optical marker 12 according to a third variant. The marker 12 according to the third variant differs from the marker according to the second variant in that instead of eight areas differing in grey value only four areas 22a, 22b, 22c, 22d are provided.

The areas 22a, 22b, 22c are formed as continuous circular strips and the area 22d is formed as a circle.

If analyzed along a line extending from the periphery 20 to a center of the marker 12, the areas 22a, 22b, 22c differ in width. In the example shown, the areas 22a, 22c are wider than the areas 22b, 22d. In other words, the areas 22a, 22b, 22c, 22d differ in spatial frequency.

Beyond that, the explanations concerning the marker 12 according to the second variant also apply to the marker 12 according to the third variant.

FIG. 12 shows a printing plate 10 having an optical marker 12 according to a fourth variant.

The optical marker 12 is substantially square-shaped.

The inner structure 18 is made up of five areas 22a, 22b, 22c, 22d, 22e, wherein the areas 22a, 22b, 22c, 22d are substantially shaped as polygonal strips having the form of a thick square line and the area 22e is formed as a square.

However, the areas of low grey value are provided with interruptions 28.

In detail, the areas 22b and 22d are not formed by a closed polygonal strip, rather is the polygonal strip interrupted once on each side. The portions of the polygonal strip extending between two interruptions 28 may also be designated polygon segments.

Beyond that, reference is made to the explanations concerning the marker 12 according to the first variant.

A position of the printing plate 10 comprising the marker 12 can be detected by performing the following method.

At first, the printing plate 10 comprising the marker 12 needs to be provided. In this context the printing plate 10 may be provided on a corresponding printing cylinder 30 as shown in FIG. 1.

Then an image of the printing plate 10 or at least a portion thereof comprising the marker 12 is taken by a camera unit 32.

Subsequently, a position of the marker 12 in the captured image is determined by identifying the structure 18 being positioned within the periphery 20 of the marker in the captured image.

In the present embodiment, this is done by evaluating the grey scale distribution as shown in FIGS. 4, 6, 8, and 10.

As can be seen from a comparison of these grey scale distributions and the corresponding printing plates 10 represented in FIGS. 3, 5, 7, and 9 respectively, the inner structure 18 has the effect that also in cases where the periphery 20 of the marker 12 cannot be clearly detected (cf. for example FIGS. 5 and 6 or 9 and 10), the inner structure 18 is still detectable.

As a consequences thereof, in all cases represented in FIGS. 3 to 10 the position of the marker 12 in the image can be determined with high reliability.

In addition to the evaluation of the grey scale distribution, an edge detection technique is applied to the image. As a result thereof, edges, i.e. border lines between areas 22a-22h of differing grey scale are determined and a corresponding length of these edges is calculated.

The lengths of all edges is cumulated and the cumulated length is taken as an indicator for detection quality. This means that a big cumulated length indicates high detection quality and a short cumulated length indicates low detection quality.

Having regard to FIGS. 3 to 6, for example the edges between the areas 22a and 22b on the right side of FIG. 5 are not detectable. Consequently, a cumulated length of detected edges in the example of FIG. 5 is lower than a cumulated length of detected edges in the example of FIG. 3.

Based on the determination of the position of the marker 12 in the captured image, the position of the printing plate 10 is derived.

Substantially two alternatives exist.

The position of the printing plate 10 can be derived with respect to an additional marker 34 which is not placed on the printing plate 10, but for example on the printing cylinder 30. This marker 34 needs to be represented in the captured image.

Alternatively, the position of the printing plate 10 can be derived by using a calibrated camera unit 32 being in a known position. As a consequence thereof, a position of at least some portions of the captured image, e.g. single pixels or pixel groups, is known and the position of the printing plate 10 can be derived on this basis.

It is noted that the position of the printing plate can be represented using a coordinate system attributed to a room, a printing machine or a printing cylinder.

FIG. 1 also shows a system 36 for detecting the position of the printing plate 10.

In addition to the camera unit 32 which has already been mentioned, this system 36 comprises a control unit 38 which is a computer in the example shown.

The control unit 38 and the camera unit 32 are coupled via a data line 40 such that an image captured by the camera unit 32 may be provided to the control unit 38.

The control unit 38 further comprises a data storage unit 42 and a data processing unit 44.

A computer program comprising computer readable program code means is stored on the data storage unit 42 and may be executed by the data processing unit 44.

The control unit 38 and the computer program executable thereon are configured for causing the method step of capturing an image of at least a portion of the printing plate 10 comprising the marker 12 by the camera unit 32.

To this end, a signal is sent from the processing unit 44 to the camera unit 32 via the data line 40 triggering the camera unit to capture an image and send the captured image to the control unit 38 via the data line 40.

The captured image is then stored in the data storage unit 42.

The control unit 38 and the computer program executable thereon are further configured for performing the step of determining the position of the marker 12 in the captured image by identifying the structure 18 being positioned within the periphery 20 of the marker 12 in the captured image.

To this end the grey scale distribution in the captured image is analyzed using the data processing unit 44.

The resulting position of the marker 12 is stored on the data storage unit 42.

Furthermore, the control unit 38 and the computer program executable thereon are configured for deriving the position of the printing plate 10 from the position of the marker 12 in the captured image.

The control unit 38 and the computer program executable thereon is configured according to one of the alternatives mentioned above in this respect.

Either a position of the further marker 34 has also been determined in the captured image and stored in the data storage unit 42.

Then the position of the printing plate 10 is derived by comparing the position of the marker 34 and the marker 12.

Alternatively, the camera unit 32 is calibrated such that at least for a portion of the captured image a corresponding position is known.

In this case, the position of the printing plate 10 is derived by comparing the position of the marker 12 to the known position of the portion of the captured image.

The derived position of the printing plate 10 may be used for determining an amount and/or a direction by which the position of the printing plate 10 shall be corrected.

The detection of the position of the printing plate 10 and a corresponding correction thereof can be performed in a closed loop control system.

The invention claimed is:

1. A method for detecting a position of a printing plate, the method comprising:
   providing a printing plate comprising at least one optical marker for detecting a position of the printing plate, wherein the at least one optical marker comprises an optically detectable structure being positioned within a periphery of the at least one optical marker, and wherein the optically detectable structure includes:
      a first structure having a first shape and a first size, and
      a second structure separated from the first structure, having a second shape that is the same as the first shape, having a second size that is different from the first size, and sharing a common center with the first structure,
   capturing an image of the printing plate or at least a portion thereof comprising the at least one optical marker by a camera unit,
   determining a position of the at least one optical marker in the captured image by identifying a structure positioned within the periphery of the at least one optical marker in the captured image, and
   deriving a position of the printing plate from the determined position of the at least one optical marker in the captured image.

2. The method according to claim 1, wherein the structure is identified by evaluating a grey scale distribution and/or a spatial frequency distribution of the captured image.

3. The method according to claim 1, wherein the structure is identified by applying one or more of a pattern recognition technique, an object recognition technique, or a digital image correlation technique to the captured image.

4. The method according to claim 1, wherein an edge detection technique is applied to a portion of the captured image comprising the at least one optical marker.

5. The method according to claim 4, wherein a cumulative length of the detected edges of the structure is calculated, especially wherein the cumulative length is taken as an indicator for detection quality.

6. A system for detecting a position of a printing plate, the system comprising:
   a control unit for detecting a position of a printing plate, the printing plate including at least one optical marker for detecting a position of the printing plate, wherein the at least one optical marker comprises an optically detectable structure being positioned within a periphery of the at least one optical marker, and wherein the optically detectable structure includes:
      a first structure having a first shape and a first size, and
      a second structure separated from the first structure, having a second shape that is the same as the first shape, having a second size that is different from the first size, and sharing a common center with the first structure,
   wherein the control unit is configured to perform a method including:
      capturing an image of the printing plate or at least a portion thereof comprising the at least one optical marker by a camera unit,
      determining a position of the at least one optical marker in the captured image by identifying a structure positioned within the periphery of the at least one optical marker in the captured image, and
      deriving a position of the printing plate from the determined position of the at least one optical marker in the captured image.

7. The system according to claim 6, further comprising:
   the camera unit, wherein the camera unit is coupled to the control unit such that an image captured by the camera unit is provided to the control unit.

8. A non-transitory computer-readable medium storing instructions that, when executed by a processor, perform operations including:
   capturing an image of a printing plate or at least a portion thereof comprising the at least one optical marker by a camera unit, the printing plate including at least one optical marker for detecting a position of the printing plate, wherein the at least one optical marker comprises an optically detectable structure being positioned within a periphery of the at least one optical marker, wherein the optically detectable structure includes:
      a first structure having a first shape and a first size, and
      a second structure separated from the first structure, having a second shape that is the same as the first shape, having a second size that is different from the first size, and sharing a common center with the first structure,
   determining a position of the at least one optical marker in the captured image by identifying a structure positioned within the periphery of the at least one optical marker in the captured image, and
   deriving a position of the printing plate from the determined position of the at least one optical marker in the captured image.

9. The non-transitory computer-readable medium of claim 8, wherein the operations further include:
   determining a total length of edges of the first structure and the second structure; and
   determining a quality of the image based on the determined total length of the edges,
   wherein the determined quality increases as the determined total length of the edges increases.

* * * * *

UNITED STATES PATENT AND TRADEMARK OFFICE
CERTIFICATE OF CORRECTION

PATENT NO. : 12,103,297 B2
APPLICATION NO. : 18/003732
DATED : October 1, 2024
INVENTOR(S) : Rainer Ochs Page 1 of 1

It is certified that error appears in the above-identified patent and that said Letters Patent is hereby corrected as shown below:

In the Claims

In Claim 1, Column 11, Line 9:
Delete "8.".

In Claim 8, Column 12, Line 26:
Delete "the".

Signed and Sealed this
Nineteenth Day of November, 2024

Katherine Kelly Vidal
*Director of the United States Patent and Trademark Office*